March 9, 1943. W. J. JACOBSSON 2,313,149
ALTITUDE CONTROLLED PRESSURE REGULATOR
Filed July 20, 1940
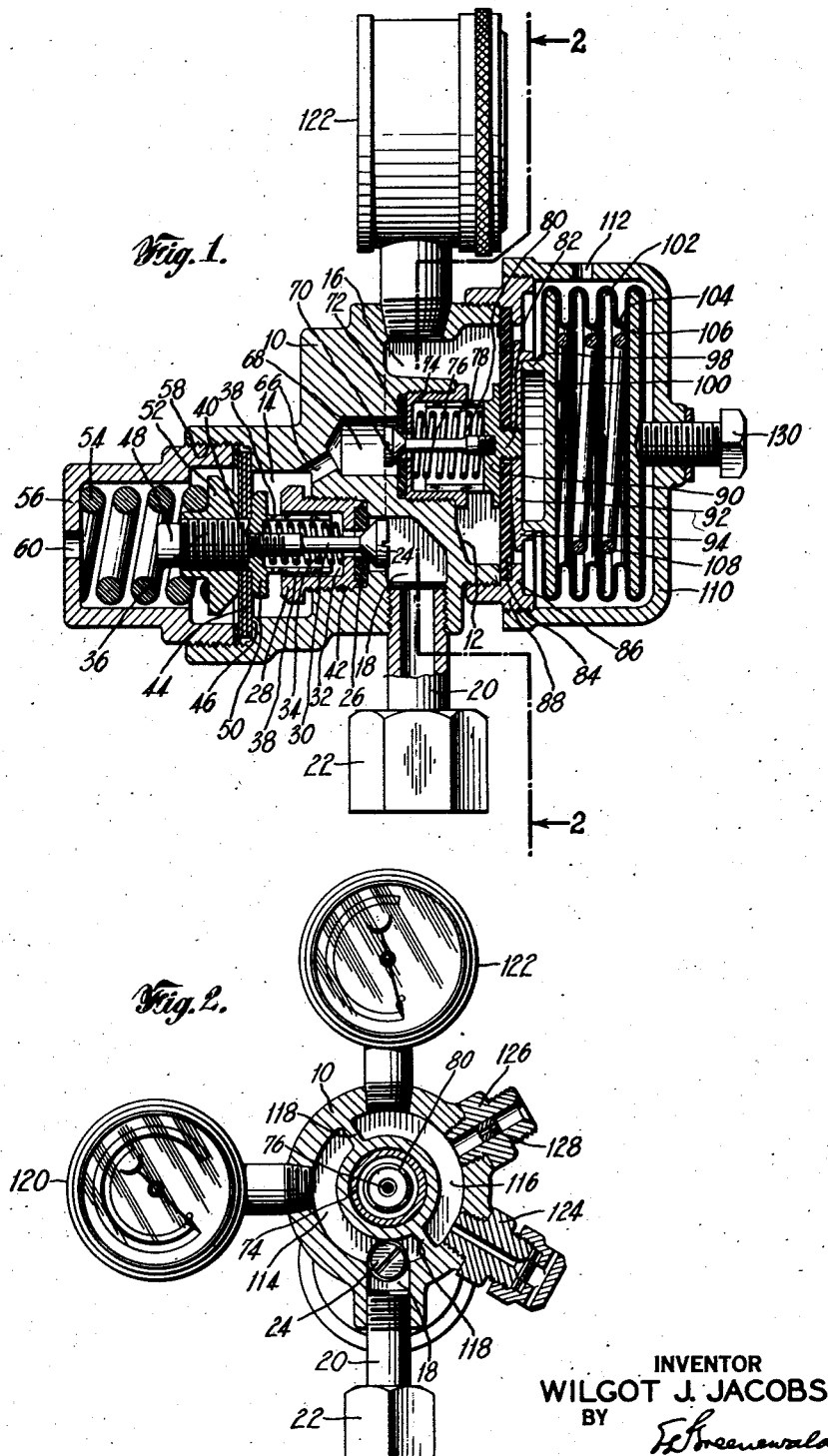
INVENTOR
WILGOT J. JACOBSSON
BY
ATTORNEY Patented Mar. 9, 1943

2,313,149

UNITED STATES PATENT OFFICE 2,313,149

ALTITUDE CONTROLLED PRESSURE REGULATOR

Wilgot J. Jacobsson, Plainfield, N. J., assignor to Union Carbide and Carbon Corporation, a corporation of New York Application July 20, 1940, Serial No. 346,473

4 Claims. (Cl. 137—153)

This invention relates to apparatus for supplying oxygen for high altitude operation of aircraft and similar purposes, and more particularly to a unitary two-stage altitude-controlled pressure regulator for reducing the pressure of the oxygen to a relatively low value.

In high altitude flying, oxygen, in addition to that available from the atmosphere, must be supplied to the occupants of an airplane to compensate for the decreased density of the atmospheric oxygen due to the increased rarity of the atmosphere. The additional amount of oxygen required is substantially proportional to the altitude at which the aircraft is flying. As both space and weight are at a premium in aircraft, the bulk and weight of the oxygen supply and associated regulating apparatus must be kept as small as possible. For this reason, the oxygen usually is supplied in cylinders in which the oxygen is compressed under relatively high pressure. In order to relieve the operator of the airplane from the necessity of controlling the supply of oxygen in accordance with changes in altitude, it has hitherto been proposed to use automatic apparatus for supplying varying quantities of oxygen to the interior of the aircraft in accordance with changes in altitude, which changes are reflected in corresponding changes in the atmospheric pressure.

When it is attempted to reduce the oxygen pressure in a single stage from the relatively high cylinder pressure to the relatively low pressure at which the oxygen is supplied to oxygen masks or other consuming appliances, wide fluctuations in the pressure of the supplied oxygen occur. It has therefore been proposed to use two or more pressure-reducing devices in series to reduce the pressure of the oxygen in more than one stage. However, this increases the number of pieces of regulating apparatus and connections, with a corresponding increase in bulk and weight and a decrease in the available space in the airplane.

The automatic means for controlling the supply of oxygen in accordance with changes in altitude and atmospheric pressure have usually comprised atmospheric pressure responsive regulators which control the supply of the oxygen. However, no satisfactory means for supplying oxygen to the consuming apparatus under relatively steady conditions, which apparatus is also light in weight and economical of space, has hitherto been devised.

It is therefore among the objects of this invention to provide a compact, light weight, oxygen supply and regulating apparatus for delivering oxygen, from a cylinder of oxygen compressed under relatively high pressure, to a consuming device, such as on oxygen mask, in which the oxygen is consumed at relatively low pressure; to provide a unitary two-stage oxygen pressure regulator in which the pressure of the oxygen is reduced from the cylinder pressure to an intermediate pressure and from the intermediate pressure to a low pressure suitable for delivery to the consuming apparatus; to provide a two-stage oxygen pressure regulator in which the pressure in the low pressure stage is controlled in accordance with variations in atmospheric pressure corresponding to variations in altitude; and to provide a simple, compact, light weight and efficient oxygen supply apparatus.

These and other objects of the invention will in part be obvious and in part become apparent from the following description and the accompanying drawing, in which:

Fig. 1 is a sectional view through one form of the apparatus embodying the principles of the invention; and Fig. 2 is a section on the line 2—2 of Fig. 1, looking in the direction of the arrows.

The objects of the invention may be accomplished by providing a two-stage fluid pressure regulator and reducing valve comprising a one-piece valve body separated into a relatively small high pressure stage or fluid chamber, a relatively small intermediate pressure stage or fluid chamber and a relatively large low pressure stage or fluid chamber. Means are provided to connect the high pressure chamber to a compressed oxygen tank outlet and to connect the low pressure chamber to a consuming device, such as an aviator's oxygen mask. Valve means are provided between the high pressure chamber and the intermediate pressure chamber to control the rate of delivery of oxygen between the two chambers in accordance with pressure conditions existing in the intermediate pressure chamber. Other valve means, preferably controlled by an atmospheric-pressure-responsive unit readily attachable to and removable from the valve body, are provided for controlling the rate of flow of oxygen from the intermediate pressure chamber to the low pressure chamber in accordance with variations in atmospheric pressure, corresponding to changes in altitude. If desired, indicating gauges may be connected to the high pressure stage or chamber and to the to low pressure stage or chamber.

Referring more particularly to the drawing, the pressure regulating and reducing valve is conveniently and compactly arranged in and on a one-piece chambered valve body 10. A partition 12 lying in a central zone in the body 10 separates small intermediate pressure stage or chamber 14 from a larger low pressure stage or chamber 16, from which latter stage oxygen is delivered at a pressure which varies in relation to the external or atmospheric pressure. The high pressure oxygen is delivered to the high pressure stage or chamber 18 in the valve body 10 through an oxygen inlet nipple 20 which may be attached to a compressed oxygen tank outlet by means of a union coupling nut 22.

The passage of the oxygen from the high pressure stage 18 to the intermediate pressure stage 14 is controlled by a valve 24 operated in response to the pressure in the intermediate stage. The valve 24 seats on a valve seat 26 maintained in place by a valve seat plug or bushing 28, through which the stem 30 of the valve 24 passes. The valve seat bushing is provided with a central cavity 32 to receive a spring 34, which fits around the valve stem 30 and rests on the bottom wall of the cavity. A diaphragm attaching screw 36 is provided with annular slotted projections 38, which fit loosely into the cavity of the valve seat bushing 28 around the spring 34, and with a centrally threaded bore 40 into which the end of the valve stem 30 is screwed. The parts so assembled are secured in the valve body 10 by the engagement of the external threads on the valve bushing or plug 28 with threads in the bore 42 in the valve body 10 within which the bushing is screwed. The bushing is screwed up until the valve seat 26 is clamped between the valve bushing or plug 28 and a shoulder in the bore which receives the bushing.

It will be noted that the valve seat plug or bushing 28 is secured in the bore 42 of the valve body 10 from the outlet side of the valve 24. This arrangement places the valve closing spring 34 on the outlet side of the valve 24 and within the reduced pressure chamber 14 where an enlarged space may be provided for the spring without increasing the size of the pressure chamber. This location of the valve closing spring within the pressure chamber permits the use of a larger diameter spring coil 34 and a proportionately shorter spring which reduces the length of the regulator without increasing the size of the regulator, and at the same time the spring 34 does not materially obstruct the passage of gas through the regulator.

The outer end of the gas chamber 14 of the intermediate pressure stage is closed by a circular diaphragm 44 resting on a shoulder 46 on the valve body 10 at the end of the chamber 14. The diaphragm 44 has a central aperture therein which receives the threaded extension 48 of the attaching screw 36, and the diaphragm is attached to the attaching screw 36 between a flange 50 on the screw and a diaphragm clamping nut 52 screwed on the extension 48. A coiled spring 54 rests on the clamping nut 52 and is compressed between the nut and the inside of the outer end of a hollow cap 56. The inner end of cap 56 is provided with screw threads, and is screwed into the diaphragm cavity 58 to hold the rim of the diaphragm 44 in leak-proof contact with the shoulder 46 on the valve body 10 and to compress the spring 54 against the action of the diaphragm 44 and the smaller spring 34 in the valve bushing cavity. A hole 60 is provided in the top of the cap to permit the ingress and egress of air to and from the inside of the cap 56. The apparatus thus far described is similar to that shown and described in Patent No. 2,057,133, issued in the names of C. K. Bryce and H. W. Jones on October 13, 1936.

In accordance with the principles of the invention, the flow of gas from the intermediate pressure chamber 14 into the low pressure chamber 16 is controlled in accordance with changes in atmospheric pressure due to changes in altitude. An oxygen inlet passage 66 in the valve body 10 extends from the gas chamber 14 to a chamber 68 which receives a valve 70 for controlling the passage of oxygen from the intermediate pressure stage 14 to the low pressure stage 16. The valve 70 seats on a valve seat 72 maintained in place by a valve seat bushing or plug 74, through which stem 76 of the valve 70 passes. The valve seat plug 74 is provided with a central cavity 78 to receive a spring 80. The construction of this valve is similar to the construction of the valve which controls the gas from the high pressure stage to the intermediate pressure stage. The valve 70, valve seat 72, valve plug 74, spring 80 and diaphragm attaching screw 82 may be similar to or duplicates of the corresponding parts used in the intermediate pressure stage and are assembled in chamber 16 of the low pressure stage in the same manner as the corresponding parts are assembled in the intermediate pressure stage. The outer wall of the low pressure fluid or oxygen chamber 16 is formed by a flexible diaphragm 84 whose outer perimeter is clamped between the end wall of the chamber 16 and a flange 86 on a clamping ring 88, forming part of an atmospheric-pressure-responsive unit, which ring is screwed on the wall of the low pressure chamber 16. The diaphragm 84 is clamped between a radially inward projecting flange 90 on the diaphragm attaching screw 82 and a diaphragm backing plate 92 provided with an annular flange 94, and is responsive to variations of oxygen pressure in chamber 16. The plate 92 is screwed on the threaded end of the screw 82.

Engaging the flange 94 is a corresponding flange 98 on a rigid member 100 forming the end wall of an expansible and contractible bellows 102. The bellows includes a flexible wall 104 which may be secured at one end to the rigid member 100, as by soldering, and at the other end to a second rigid member 106 relatively fixed in position and forming the other end wall of the bellows. Disposed in the bellows 102 is a spring 108 for a purpose described hereinafter. A hollow cap or casing 110 is set over and encloses the bellows 102 and is screwed to the clamping ring 88. The cap 110 is provided with a hole 112 whereby the interior of the cap is exposed to atmospheric pressure to allow atmospheric pressure to affect the bellows 102. The diameter of the chamber 16 of the low pressure stage and the effective area of diaphragm 84 that closes the chamber are made larger than the corresponding elements of the intermediate pressure stage due to the lower pressure maintained in the low pressure chamber 16, and in order to obtain a more accurate regulation of the pressure in the latter chamber.

The clamping ring 88, bellows 102, spring 108, and cap or casing 110 form an atmospheric-pressure-responsive unit which is readily attachable to and removable from the valve body 10. For this purpose, it will be noted that the internal diameter of the radially inwardly projecting flange 86 of the ring 88 is less than the external diameter of the rigid member 100 forming the end wall of the bellows 102. Thereby, when the ring 88 is unscrewed from the body 10, the unit will be maintained in assembled relation. When the unit is coupled to the body 10, the flange 86 on the ring 88 acts as means operative to clamp the rim of the diaphragm 84 in sealing relation to the chamber 16. When the unit is removed from the body 10, the ring acts as means carried by the cap and operable to retain the bellows 102 and the spring 108 within the cap or casing 110.

An arcuate groove 114 is formed in the partition 12 of the valve body 10 and extends from the high pressure stage inlet or nipple 20 around a portion of the circumference of the valve body. A similar groove 116 is formed in the valve partition 12 and communicates with the low pressure stage 16. The high pressure groove 114 is separated from the low pressure groove 116 by partitions 118 in the valve body. A high pressure gauge 120 may be connected to the high pressure groove 114, and a safety plug 124 and a low pressure gauge 122 are connected to the low pressure groove 116. Also connected to the low pressure groove 116 is an oxygen outlet nipple 126 provided with a restricting orifice 128. A screw 130 is threaded in the outer end of the cap 110 for the purpose to be described hereinafter.

The operation of the invention is as follows: The diaphragm spring 54 of the intermediate pressure stage is designed to reduce the supply pressure to a substantially lower pressure which exceeds the maximum pressure delivered to the low pressure stage but is preferably maintained very low so that the effective load maintained on the intermediate pressure diaphragm, having a smaller effective area than the effective area of the low pressure diaphragm, will be less than the effective load on the low pressure diaphragm. This is done in order that a smaller diaphragm spring as well as a smaller diaphragm may be used in the intermediate pressure stage than is required in the low pressure stage. The pressure maintained in the intermediate pressure stage may be varied by changing the spring 54 for one of different strength. The spring 54 is made non-adjustable to prevent the operator of the regulator from changing the pressure setting of the intermediate pressure stage and thereby allow excessive pressure to accumulate in the intermediate pressure stage. The oxygen, under the excess pressure, may rush into the low pressure stage and injure the diaphragm 84 therein before the valve 70 can close the passage which connects the two stages.

The bellows 102 and the spring 108 therein are so designed that the bellows will expand with a decrease in atmospheric pressure to gradually increase the pressure exerted on the diaphragm 84 over a wide range in altitude. The set screw 130 is provided for adjusting the low stage regulator so that it will begin to operate at the desired altitude. As the relatively fixed position of the end wall 106 is changed and the bellows 102 and the spring 108 are compressed by the adjusting screw 130, the device will begin to deliver oxygen at a lower altitude. Hence, by a suitable adjustment of the screw 130, oxygen delivery may be made to commence at any selected altitude.

As the altitude of the aircraft, or other means, in which the regulator is disposed increases beyond the altitude for which the screw 130 has been set, the valve 70 will begin to open under the action of the bellows 102 and the spring 108, and the delivery of oxygen at the desired pressure to the nipple 126 will begin. As the altitude increases, the atmospheric pressure decreases and the valve 70 will thus be opened more widely due to the action of the bellows 102 and spring 108. As the delivery pressure varies inversely as the atmospheric pressure, the delivery pressure of the oxygen will also increase. These two factors result in an increase in the volume of oxygen delivered as the altitude increases.

The restricting orifice 128, located in nipple 126, acts as a pressure equalizing means preventing sudden changes of pressure in the chamber 16 from being immediately reflected in the delivery lines connected to the nipple 126. This assures an even regulated flow of oxygen at a desired pressure and volume corresponding to the given altitude.

In reducing the high pressure of oxygen in the pressure tank to the intermediate pressure, the gradually decreasing tank pressure acting on the exposed surface of the intermediate pressure stage controlling valve 24 causes the valve to open and close in response to a pressure greater than that at which it responded when the tank was under a higher pressure, and therefore, the pressure maintained in the intermediate pressure chamber increases with a given spring 54 as the gas pressure in the tank decreases. Sometimes, the moisture in the oxygen freezes as it expands from the high pressure stage to the intermediate pressure stage, and these cold pellets clog the opening and produce pressure impulses in the reduced pressure. While these variations in pressure in the intermediate pressure stage are great enough to deleteriously affect the character of the oxygen flow from the low pressure stage, they are not great enough to materially affect the regulating action of the low pressure stage control valve 70. The oxygen absorbs sufficient heat at the intermediate pressure stage to melt any pellets of frozen moisture that may have been formed and the reduction in pressure between the intermediate pressure stage and the low pressure stage is not sufficient to cause the reformation of these pellets. Due to the substantially constant reduced pressure maintained in the intermediate pressure stage, the oxygen passes therefrom to the low pressure stage without producing any irregular action in the low pressure stage control valve, such as is produced in the action of the intermediate pressure stage control valve. The low pressure control valve is therefore capable of maintaining, in the low pressure stage, a pressure corresponding to a given altitude.

It will be noted that the inlet to and the discharge from the valve casing, and the pressure gauges and the safety plugs, are conveniently arranged around the circumference of the valve casing in the central plane of the partition 12 in the valve body 10. Also, the intermediate pressure stage and the low pressure stage are located at opposite sides of this plane. This construction gives a compact arrangement of the parts and places the center of gravity of the regulator close to the longitudinal axis of the compressed oxygen tank when the inlet of the regulator is attached to the outlet from the tank. This feature results in a considerable saving of space in the aircraft. Correspondingly, the incorporation of both of the pressure stages in a single unitary body reduces the weight of the apparatus necessary to be carried while permitting sufficient regulation of the flow of oxygen at all altitudes.

If desired, variations in the effect of the bellows due to temperature changes may be substantially overcome by exhausting air from the bellows and making the spring 108 sufficiently heavy to overcome the external pressure.

While a preferred form of the invention has been shown, it should be understood that changes may be made in the form shown without departing from the scope of the invention as defined in the appended claims.

What is claimed is:

1. A fluid pressure regulator comprising, in combination, a body formed with a fluid chamber; a flexible diaphragm forming one wall of said chamber; a valve secured to said diaphragm and controlling the flow of fluid into said chamber; a clamping ring threadedly secured to said body and having a radially inwardly projecting flange overlying the rim of said diaphragm and holding the latter in sealing engagement with said body to seal said chamber; a backing plate secured to said diaphragm and formed with an annular flange; a resilient bellows having two rigid end walls, one end wall being formed with an annular flange interfitting the annular flange on said backing plate, said bellows being responsive to changes in atmospheric pressure; a spring in said bellows engaging said end walls; a hollow cap enclosing said bellows and threadedly secured to said clamping ring, the interior of said cap being exposed to atmospheric pressure; and a screw threaded through the end wall of said cap and engaging the other end wall of said bellows and operable to adjust the compression of both said spring and said bellows.

2. An altitude-controlled oxygen supply regulator comprising, in combination, a body provided with an oxygen inlet, an oxygen chamber having an open end, an oxygen outlet for said chamber, and a valve controlling the flow of oxygen from said inlet into said chamber; and means for actuating said valve, such means comprising a flexible diaphragm operatively connected to said valve and responsive to variations of the oxygen pressure in said chamber, a ring detachably secured to said body and clamping the margin of said diaphragm against the edge extending around said open end of said chamber, a cap detachably secured to said ring and having its interior exposed to atmospheric pressure, an expansible and contractible bellows in said cap and responsive to changes in atmospheric pressure, a spring within said bellows and tending to expand said bellows, means carried by said cap and operable to adjust the position of one end of said bellows and the corresponding end of the spring therein, both said spring and said bellows being adapted to bear against said diaphragm to actuate said valve in response to changes in atmospheric pressure, a portion of said ring projecting within said cap and adapted to engage said bellows and retain the latter and said spring within said cap when said ring and said cap are detached as a unit from said body.

3. For use with a fluid supply regulator having a body provided with a chamber, one wall of which comprises a flexible, valve-position-controlling diaphragm, an atmospheric-pressure-responsive unit readily attachable to and removable from said body comprising, in combination, a cap adapted to be detachably secured to said body and having its interior exposed to atmospheric pressure; a bellows disposed in said cap and both expansible and contractible in response to changes in atmospheric pressure; a spring in said bellows and tending to expand said bellows; means carried by said cap and operable to adjust the position of one end of said bellows and the corresponding end of the spring therein; both said bellows and said spring being adapted to bear against said diaphragm when said cap is attached to said body, to actuate said diaphragm in response to changes in atmospheric pressure; and means carried by said cap and operable to retain both said bellows and said spring within said cap when said unit is removed from the regulator.

4. An atmospheric-pressure-responsive unit, as claimed in claim 3, wherein the last-named means which is operative to retain both the bellows and the spring within the cap also is operative to clamp the rim of said diaphragm in sealing relation to said chamber in said body when said unit is attached to said body.

WILGOT J. JACOBSSON.